United States Patent
Parihar et al.

(10) Patent No.: US 11,722,905 B1
(45) Date of Patent: Aug. 8, 2023

(54) DEDICATING ANTENNA ELEMENTS TO SPECIFIC WIRELESS DEVICES

(71) Applicant: T-Mobile Innovations LLC, Overland Park, KS (US)

(72) Inventors: Vanil Parihar, Overland Park, KS (US); Sreekar Marupaduga, Overland Park, KS (US); Nitesh Manchanda, Overland Park, KS (US); Rashmi Kumar, Herndon, VA (US)

(73) Assignee: Sprint Spectrum LP, Overland Park, KS (US)

(*) Notice: Subject to any disclaimer, the term of this patent is extended or adjusted under 35 U.S.C. 154(b) by 0 days.

(21) Appl. No.: 17/469,013

(22) Filed: Sep. 8, 2021

Related U.S. Application Data

(63) Continuation of application No. 16/670,296, filed on Oct. 31, 2019, now Pat. No. 11,166,166.

(51) Int. Cl.
| | |
|---|---|
| *H04W 16/10* | (2009.01) |
| *H04W 8/22* | (2009.01) |
| *H04B 7/06* | (2006.01) |
| *H04W 88/10* | (2009.01) |
| *H04W 92/10* | (2009.01) |
| *H04W 84/04* | (2009.01) |

(52) U.S. Cl.
CPC .......... *H04W 16/10* (2013.01); *H04B 7/06* (2013.01); *H04W 8/22* (2013.01); *H04W 84/042* (2013.01); *H04W 88/10* (2013.01); *H04W 92/10* (2013.01)

(58) Field of Classification Search
CPC ....... H04W 16/10; H04W 8/22; H04W 88/10; H04W 92/10; H04W 84/042; H04W 16/02; H04W 16/04; H04W 16/00; H04B 7/06
See application file for complete search history.

(56) References Cited

U.S. PATENT DOCUMENTS

| | | | |
|---|---|---|---|
| 9,337,973 B2 * | 5/2016 | Hou | H04L 5/0035 |
| 9,768,983 B2 | 9/2017 | Marzetta et al. | |
| 10,285,160 B2 | 5/2019 | Kyeong et al. | |
| 10,716,158 B1 * | 7/2020 | Pawar | H04L 5/001 |
| 11,166,166 B1 * | 11/2021 | Parihar | H04B 7/0691 |
| 2011/0081902 A1 * | 4/2011 | Seo | H04L 5/0057 455/423 |
| 2011/0310804 A1 * | 12/2011 | Beygzadeh | H04W 68/00 370/328 |
| 2012/0002632 A1 * | 1/2012 | Takagi | H04W 72/0426 370/329 |
| 2018/0006379 A1 * | 1/2018 | Cariou | H04W 16/28 |
| 2018/0241136 A1 * | 8/2018 | Sharawi | H04B 5/00 |

* cited by examiner

*Primary Examiner* — Afshawn M Towfighi
(74) *Attorney, Agent, or Firm* — Jones Robb, PLLC

(57) ABSTRACT

Dedicating antenna elements to specific wireless devices by identifying specific wireless devices that meet a set of criteria, such as wireless devices using a certain application type that is associated with a bandwidth, and respectively dedicating a separate portion of antenna elements for communicating with each specific wireless device. The separate portion of antenna elements is selected based on being configured to utilize a bandwidth that meets a threshold bandwidth or matches the bandwidth associated with the application type.

20 Claims, 5 Drawing Sheets

DEDICATING ANTENNA ELEMENTS TO SPECIFIC WIRELESS DEVICES

This patent application is a continuation of U.S. patent application Ser. No. 16/670,296, filed on Oct. 31, 2019, which is incorporated by reference in its entirety for all purposes.

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. While channel bandwidths in 4G are static, 5G is capable of deploying various different bandwidths, most of which are higher than 4G bandwidths. Further, "Dual Connectivity" refers to the ability for wireless devices to attach to two or more access nodes and transmit/receive information via two wireless connections simultaneously. In exemplary situations, dual connectivity can include E-UTRAN-NR Dual Connectivity (EN-DC), which uses both 4G and 5G RATs.

There are considerations regarding how to optimally communicate between an access node comprising a plurality of antenna elements utilizing different bandwidths or RATs, and wireless devices utilizing different application types. Further, increasing proliferation of 5G capable wireless devices can cause contention for resources between such 5G wireless devices and other legacy wireless devices, including 4G wireless devices.

Overview

Exemplary embodiments described herein include systems, methods, and processing nodes for dedicating antenna elements to specific wireless devices. An exemplary method for dedicating antenna elements to specific wireless devices includes determining that a first wireless device attached to an access node meets a set of criteria, wherein the criteria is associated with an application type and, responsive to determining that the first wireless device meets the set of criteria, assigning a first portion of the antenna elements of the access node for communicating with the first wireless device.

An exemplary system for dedicating antenna elements to specific wireless devices includes a processing node, and a processor coupled to the processing node. The processor can be configured to perform operations including determining that an application type of one or more wireless devices attached to an access node meets a criteria, wherein the access node comprises a plurality of antenna elements and, responsive to determining that the application type of the one or more wireless devices meets the criteria, dedicating a portion of antenna elements from among the plurality of antenna elements for communicating with the one or more wireless devices.

An exemplary processing node for dedicating antenna elements to specific wireless devices is configured to perform operations including determining that a first wireless device attached to an access node meets a criteria, wherein the criteria is associated with an application type, responsive to determining that the first wireless device meets the criteria, configuring the first wireless device to communicate with the access node via a first portion of antenna elements of the access node, determining that a second wireless device attached to the access node does not meet the criteria, and responsive to determining that the second wireless device does not meet the set of criteria, preventing the second wireless device from communicating with the access node via the first portion of antenna elements. The second wireless device can communicate with the access node via one or more remaining antenna elements of the access node.

DETAILED DESCRIPTION

Figure 1:
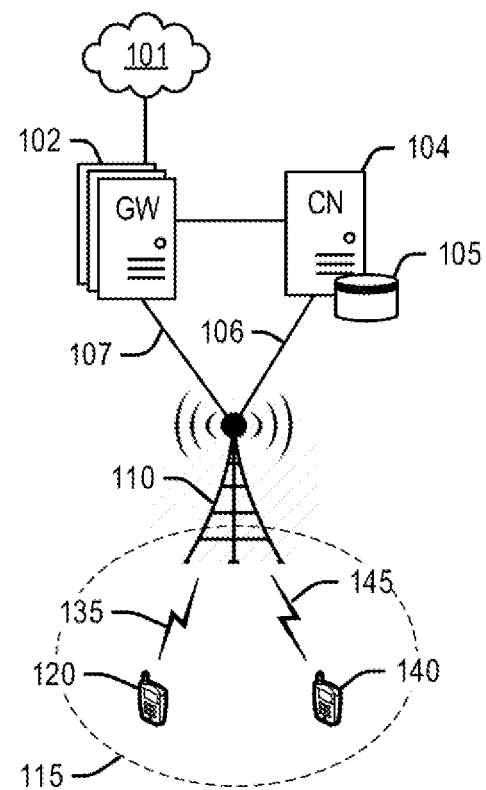
FIG. 1 depicts an exemplary system for dedicating antenna elements to specific wireless devices.

The following disclosure provides systems and methods for dedicating antenna elements of an access node towards communicating with specific wireless devices that meet a set of criteria associated with an application requirement or a preferred bandwidth size or channel size. The access node can communicate over a plurality of channel sizes and/or RATs. For example, the access node can include a combination of a 4G eNodeB and a 5G gNodeB. In other words, the access node can comprise antennae that are configured to communicate using 4G LTE (i.e. the first RAT) as well as antennae that are configured to communicate using 5G NR (the second RAT). Further, the access node can include a plurality of antennae (or antenna elements), a portion of which is configured to deploy a first bandwidth or RAT (e.g. 4G LTE), and a portion of which is configured to deploy a second bandwidth or RAT (e.g. 5G NR). Further, the 4G portion can be configured to utilize a 15 MHz or 20 MHz channel bandwidth, and the 5G portion can be configured to utilize various bandwidths ranging from 15 MHz to 100 MHz.

Thus, operations disclosed herein include determining that a wireless device is using an application that requires (or would be optimized with) a specific bandwidth, responsive to which a specific portion of the antennae is assigned for communicating with the wireless device. The wireless device and/or application type may be compared with one or more criteria. For example, a quality of service class indicator (QCI) of a wireless device may be identified and, based thereon, if the wireless device is using an application that ideally performs with a high bandwidth, and if the wireless device is capable of 5G communication, then the first portion of antennae (i.e. the 5G NR portion) is used to communicate with the wireless device. In exemplary embodiments disclosed herein, wireless devices meeting the criteria may include any wireless device capable of multi- RAT communication, such as wireless devices comprising a gigabit-class LTE modem and a gigabit-class 5G modem. Such a wireless device can support high frequency, short wave length radio communication associated with 5G NR, and can be capable of adaptive beam-forming and beam tracking, 8X carrier aggregation (CA), combining different 100 MHz blocks of millimeter wave spectrum, etc.

In addition, in 5G EN-DC systems, control transmissions continue to utilize the non-dedicated 4G antenna elements, reserving the 5G antenna elements for data communication (i.e. payloads, etc.) with the wireless devices meeting the criteria. Generally, 5G NR utilizes larger channel bandwidths and frequencies than 4G LTE. Thus, transmitting data information using the second RAT (e.g. 5G) can be beneficial to network operation by, for instance, improving throughput, while transmitting signaling information using the first RAT (e.g. 4G) can be beneficial by, for instance, utilizing ubiquitous existing infrastructure for performing signaling operations, since dedicating a high-bandwidth portion of antenna ports provides more spectral efficiency. These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-10.

FIG. 1 depicts an exemplary system 100 comprising a communication network 101, gateway 102, controller node 104, access node 110, and wireless devices 120 and 130. In this exemplary embodiment, access node 110 may be configured to deploy carriers using at least two RATs, e.g. 4G LTE and 5G NR, over a coverage area 115. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, access node 110 can be configured to communicate using both RATs at the same time. For example, access node 110 can comprise antennae that are configured to communicate using 4G LTE (i.e. the first RAT) as well as antennae that are configured to communicate using 5G NR (the second RAT). As described herein, the access node 110 includes (or is communicatively coupled to) a plurality of antenna elements, which may collectively comprise an antenna array. A first portion of antenna elements of the antenna array may be dedicated to communication with any of wireless devices 120, 130 (or any other wireless device not shown herein) that meets one or more criteria based on an application type or requirement. The first portion of antenna elements can be configured to utilize a higher bandwidth, such as used for 5G communication. Further, the antenna array of access node 110 can include a second portion of antenna elements configured to utilize a second bandwidth, such as a lower bandwidth used for 4G communication. In an exemplary embodiment, access node 110 is configured to utilize 5G EN-DC, dual connections are initiated with a wireless device using both 4G and 5G carriers, the 4G carrier being used to transmit control information, and the 5G carrier being used to transmit data information. In other embodiments, access node 110 may comprise an eNodeB that is coupled to another access node comprising a gNodeB (not shown), such that the dual connectivity utilizes both access nodes. Further, in other embodiments, access node 110 can be among a plurality of access nodes, with various carriers deployed therefrom, as may be evident to those having ordinary skill in the art in light of this disclosure.

By virtue of being within coverage area 115, both wireless devices 120, 130 can be in direct communication with access node 110. Further, each of wireless devices 120, 130 may be using a different application that is associated with a different bandwidth that optimizes function of the application. In addition, one or both of wireless devices 120, 130 can be capable of communicating with access node 110 using either a high bandwidth (e.g. via a 5G NR air interface) or with both first and second RATs by, for example, including 4G LTE and 5G NR transceivers. Thus, a processing node within system 100 (for example, communicatively coupled to access node 110, controller node 104, or any other network node) can be configured to determine whether or not wireless devices 120, 130 are capable of communicating using both RATs, and instruct the access node 110 to broadcast an indicator in, for example, a system information message. For example, access node 110 may use the 4G carrier to control and set up a dual connectivity session with one or both of wireless devices 120, 130. In other words, control information (including SIB messages) is transmitted from the access node 110 using the 4G carrier, while the 5G carrier is utilized for transmission of data. Further, the processing node may be configured to perform operations including determining that a first wireless device (e.g. wireless device 120) meets a criteria associated with an application type and, responsive to determining that wireless device 120 meets the criteria, assigning a first portion of the antenna elements of the access node 110 for communicating with the wireless device 120. Determining that the wireless device 120 meets the set of criteria comprises identifying a quality of service class indicator (QCI) associated with the wireless device 120, and matching the QCI with the application type. Further, the application type can be correlated with a first bandwidth, and the first portion of the antenna elements is determined as being configured to deploy at least the first bandwidth.

Assigning the antenna elements includes allocating resources used to communicate with wireless device 120 (such as resource blocks, bearers, channels, etc.) to antenna elements of access node 110 that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. Further, the assignment is maintained for communication with wireless device 120 for as long as needed, thus may be termed a dedicated assignment. In other words, while any wireless devices attached to access node 110 that do not meet the criteria (e.g. wireless device 130) share antenna elements dynamically based on their location, signal conditions, etc., wireless devices meeting the criteria (e.g. wireless device 120) are assured continued and dedicated communication via the dedicated portion of antenna elements as a consequence of meeting specific criteria. For example, it can be determined that wireless device 130 does not meet the set of criteria, and a second portion of the antenna elements of the access node assigned for communicating with the wireless device 130. The second portion of the antenna elements is configured to deploy a second bandwidth that is smaller than the first bandwidth. Further, wireless device 130 can be prevented from communicating with the access node via the first portion of antenna elements, using scheduling means or any other means. In addition, dedicated communication with the wireless device 120 can include scheduling data information with the wireless device 120 using resources allocated towards the first (i.e. dedicated) portion of antenna elements and scheduling control information using resources allocated towards the second portion of antenna elements.

In an exemplary embodiment, a size of the first portion of antenna elements is configurable. For example, a throughput of the first portion of antenna elements can reach a high threshold, upon with a quantity of antenna elements within the first portion of antenna elements can be increased. Determining that the throughput of the first portion of antenna elements meets the threshold can be based on determining that a quantity of wireless devices that meet the set of criteria meets a threshold quantity. Other means for monitoring the throughput of specific antenna elements can be conceived by those having ordinary skill in the art in light of this disclosure. For example, a size of the portion of antenna elements can be dynamically adjusted based on a number of specific wireless devices that meet the criteria, as well is based on which criteria are met by each specific wireless device. For example, one or more characteristics of each specific wireless device may be obtained and the antenna elements split into several portions based in part on the quantity of identified specific wireless devices that meet the criteria and based on part on the criteria that each specific wireless device meets. Further in an exemplary embodiment, an amount of resources (including power levels, resource blocks, etc.) can be assigned to each portion of antenna elements based on the characteristic of each specific wireless device or criteria that each specific wireless device meets.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115 in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 120, 130 may be any device, system, combination of devices, or other such communication platform capable of communicating wirelessly with access node 110 using one or more frequency bands deployed therefrom. Each of wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include 51 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna information of access node 110, capabilities of wireless devices 120, 130, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or networks 101, 201.

Figure 2:
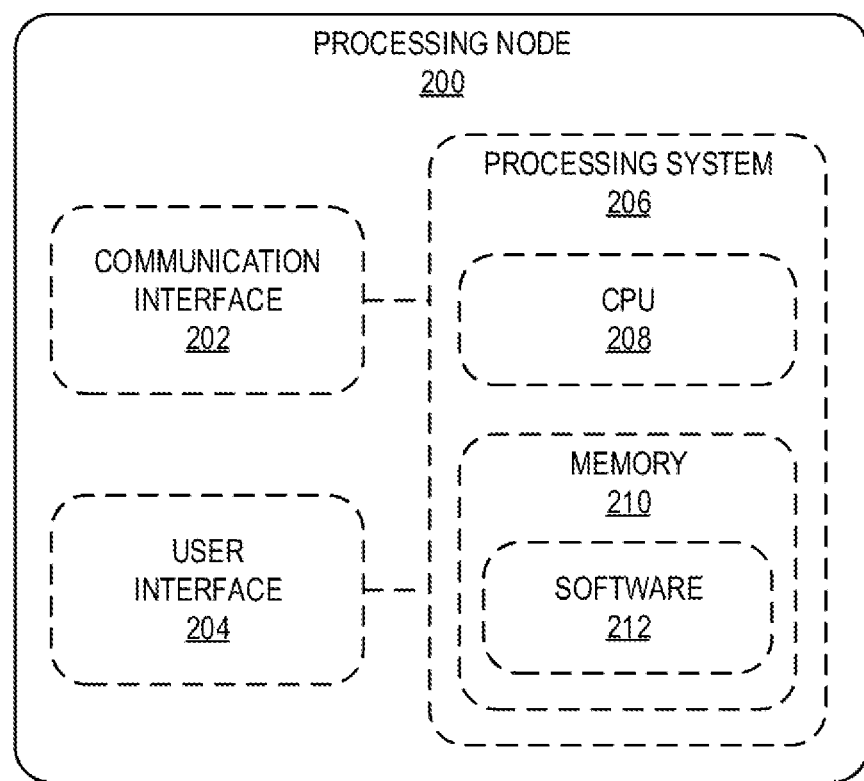
FIG. 2 depicts an exemplary processing node for dedicating antenna elements to specific wireless devices.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for determining that a first wireless device attached to an access node meets a set of criteria, wherein the criteria is associated with an application type and, responsive to determining that the first wireless device meets the set of criteria, assigning a first portion of the antenna elements of the access node for communicating with the first wireless device. In another exemplary embodiment, software 212 can include instructions for determining that an application type of one or more wireless devices attached to an access node meets a criteria, wherein the access node comprises a plurality of antenna elements and, responsive to determining that the application type of the one or more wireless devices meets the criteria, dedicating a portion of antenna elements from among the plurality of antenna elements for communicating with the one or more wireless devices. In yet another exemplary embodiment, software 212 can include instructions for determining that a first wireless device attached to an access node meets a criteria, wherein the criteria is associated with an application type, responsive to determining that the first wireless device meets the criteria, configuring the first wireless device to communicate with the access node via a first portion of antenna elements of the access node, determining that a second wireless device attached to the access node does not meet the criteria, and responsive to determining that the second wireless device does not meet the set of criteria, preventing the second wireless device from communicating with the access node via the first portion of antenna elements. The second wireless device can communicate with the access node via one or more remaining antenna elements of the access node.

Figure 3:
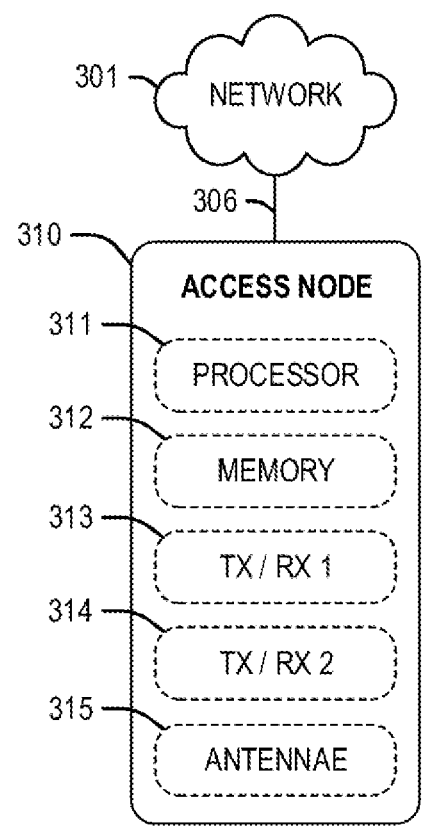
FIG. 3 depicts an exemplary access node for dedicating antenna elements to specific wireless devices.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, first transceiver 313, second transceiver 314, and antennae 315 (hereinafter referred to as antenna elements 315). Processor 311 executes instructions stored on memory 312, and transceivers 313 and 314 (in conjunction with antenna elements 315) enable wireless communication respectively using a first RAT (e.g. 4G LTE) and a second RAT (e.g. 5G NR). Thus, access node 310 may be determined as being capable of communicating using both 4G LTE and 5G NR. For example, access node 310 may be configured to transmit control information using the 4G LTE transceiver 313 and data information using the 5G NR transceiver 314. Further, antenna elements 315 may include an array of antenna elements that are configured to deploy a radio air interface over one or more wireless sectors, form beams within these sectors, employ multiple-input-multiple-output (MIMO), etc.

Exemplary instructions stored on memory 312 can include instructions for determining that a first wireless device attached to access node 310 meets a set of criteria, wherein the criteria is associated with an application type and, responsive to determining that the first wireless device meets the set of criteria, assigning a first portion of the antenna elements 315 of the access node 310 for communicating with the first wireless device. In another exemplary embodiment, memory 312 can include instructions for determining that an application type of one or more wireless devices attached to access node 310 meets a criteria, wherein the access node comprises a plurality of antenna elements 315 and, responsive to determining that the application type of the one or more wireless devices meets the criteria, dedicating a portion of antenna elements 315 for communicating with the one or more wireless devices. In yet another exemplary embodiment, memory 312 can include instructions for determining that a first wireless device attached to access node 310 meets a criteria, wherein the criteria is associated with an application type, responsive to determining that the first wireless device meets the criteria, configuring the first wireless device to communicate with the access node 310 via a first portion of antenna elements 315, determining that a second wireless device attached to the access node 310 does not meet the criteria, and responsive to determining that the second wireless device does not meet the set of criteria, preventing the second wireless device from communicating with the access node via the first portion of antenna elements 315. The second wireless device can communicate with the access node via one or more remaining antenna elements 315 of the access node 310.

Figure 4:
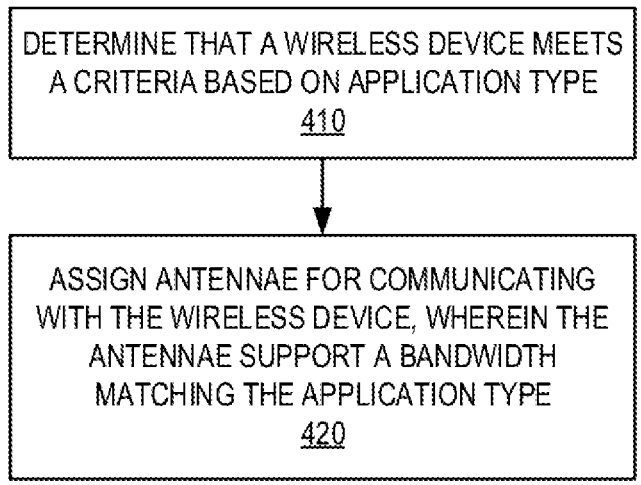
FIG. 4 depicts an exemplary method for dedicating antenna elements to specific wireless devices.

FIG. 4 depicts an exemplary method for dedicating antenna elements to specific wireless devices. The method of FIG. 4 may be implemented by a processing node communicatively coupled to one or more donor access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, it is determined that a wireless device meets a criteria based on an application type, responsive to which, at 415, antennae are assigned for communicating with the wireless device, the antennae supporting a bandwidth that matches the application type. Determining that a wireless device meets the criteria comprises identifying a quality of service class indicator (QCI) associated with the wireless device, and matching the QCI with the application type. Further, the application type can be correlated with a first bandwidth, and the first portion of the antenna elements is determined as being configured to deploy at least the first bandwidth. Further, assigning the antenna elements includes allocating resources used to communicate with the wireless device (such as resource blocks, bearers, channels, etc.) to antenna elements of the access node that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. Further, the assignment is maintained for communication with the wireless device for as long as needed, thus may be termed a dedicated assignment. In other words, while any wireless devices attached to the access node that do not meet the criteria share antenna elements dynamically based on their location, signal conditions, etc., wireless devices meeting the criteria are assured continued and dedicated communication via the dedicated portion of antenna elements as a consequence of meeting specific criteria. In addition, dedicated communication with the wireless device can include scheduling data information with the wireless device using resources allocated towards the dedicated portion of antenna elements and scheduling control information using resources allocated towards the second portion of antenna elements.

Figure 5:
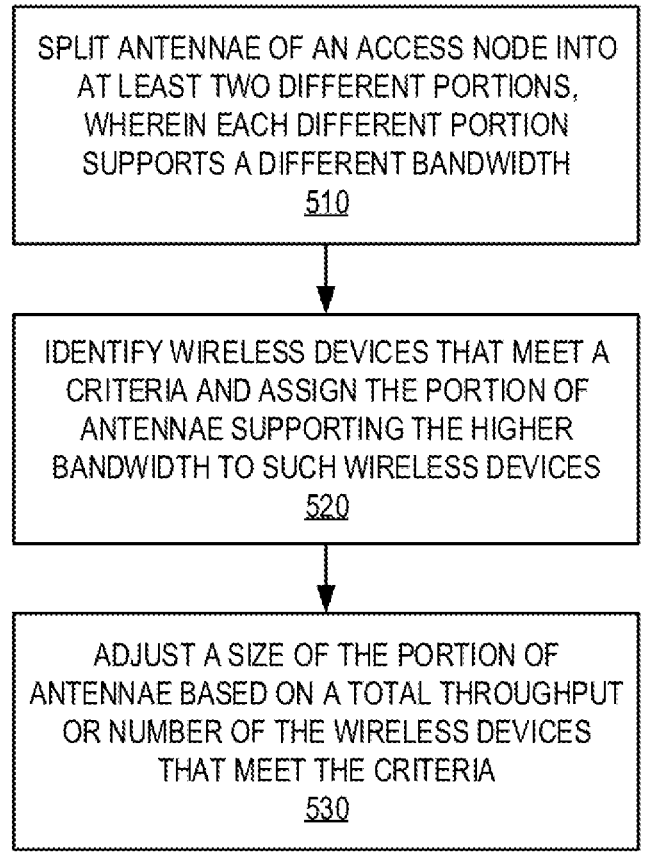
FIG. 5 depicts an exemplary method for adjusting a size of a portion of antenna elements dedicated to specific wireless devices.

FIG. 5 depicts an exemplary method for adjusting a size of a portion of antenna elements dedicated to specific wireless devices. The method of FIG. 5 may be implemented by a processing node communicatively coupled to one or more donor access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, antenna elements (or antennae) coupled to an access node are split into at least two different portions, each of which supports (or is configured to utilize) a different bandwidth. The antenna elements may be part of a remote radio head coupled to the access node, and may form an antenna array. In an exemplary embodiment, the antenna elements are split into a first portion configured to utilize a lower bandwidth radio access technology (such as 4G LTE), and a second portion configured to utilize a higher bandwidth radio access technology (such as 5G NR). Further, at 510, it is determined that a wireless device meets a criteria based on an application type, responsive to which antennae are assigned for communicating with the wireless device, the antennae supporting a bandwidth that matches the application type. Determining that a wireless device meets the criteria comprises identifying a quality of service class indicator (QCI) associated with the wireless device, and matching the QCI with the application type. Further, the application type can be correlated with a first bandwidth, and the first portion of the antenna elements is determined as being configured to deploy at least the first bandwidth. Further, assigning the antenna elements includes allocating resources used to communicate with the wireless device (such as resource blocks, bearers, channels, etc.) to antenna elements of the access node that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. Further, the assignment is maintained for communication with the wireless device for as long as needed, thus may be termed a dedicated assignment. In other words, while any wireless devices attached to the access node that do not meet the criteria share antenna elements dynamically based on their location, signal conditions, etc., wireless devices meeting the criteria are assured continued and dedicated communication via the dedicated portion of antenna elements as a consequence of meeting specific criteria. In addition, dedicated communication with the wireless device can include scheduling data information with the wireless device using resources allocated towards the dedicated portion of antenna elements and scheduling control information using resources allocated towards the second portion of antenna elements.

Figure 6A:
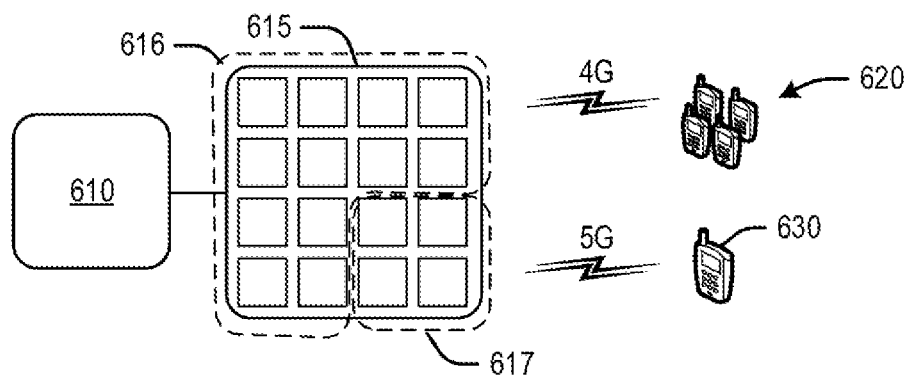
FIGS. 6A-6C depict exemplary assignments of antenna elements for dedicated communication with specific wireless devices.
Figure 6B:
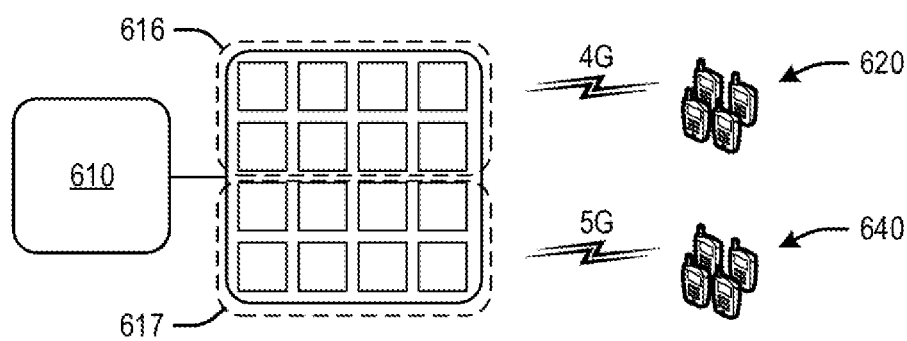
Figure 6C:
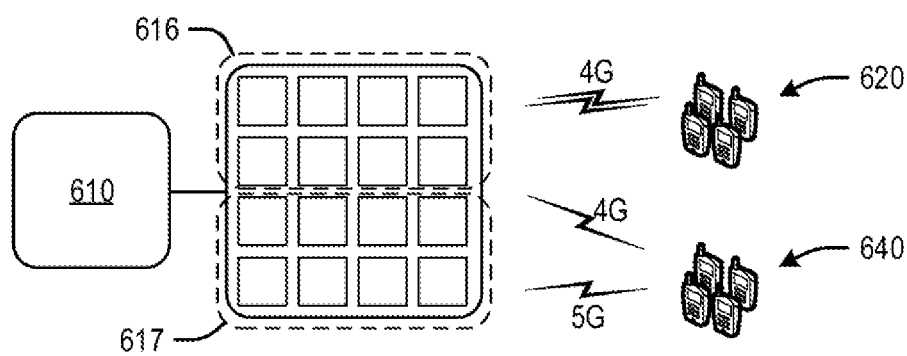

Then at 530, the size of the portion of antennae can be adjusted based on a throughput across the antenna elements in the portion and/or a number of wireless devices that meet the criteria and are using the portion of antennae. For example, a throughput of the first portion of antenna elements can reach a high threshold, upon with a quantity of antenna elements within the first portion of antenna elements can be increased. Determining that the throughput of the first portion of antenna elements meets the threshold can be based on determining that a quantity of wireless devices that meet the set of criteria meets a threshold quantity. Other means for monitoring the throughput of specific antenna elements can be conceived by those having ordinary skill in the art in light of this disclosure. For example, a size of the portion of antenna elements can be dynamically adjusted based on a number of specific wireless devices that meet the criteria, as well is based on which criteria are met by each specific wireless device. For example, one or more characteristics of each specific wireless device may be obtained and the antenna elements split into several portions based in part on the quantity of identified specific wireless devices that meet the criteria and based on part on the criteria that each specific wireless device meets. Further in an exemplary embodiment, an amount of resources (including power levels, resource blocks, etc.) can be assigned to each portion of antenna elements based on the characteristic of each specific wireless device or criteria that each specific wireless device meets FIGS. 6A-6C illustrate exemplary assignments of portions of antenna elements 615 to specific wireless devices. In this exemplary embodiment, access node 610 may be configured to deploy carriers using at least two RATs, e.g. 4G LTE and 5G NR, with each RAT configured to utilize a different frequency band or sub-band, a different channel size or bandwidth, and so on. For example, the 5G NR carrier may be configured to utilize higher frequencies and larger channel bandwidths than the 4G LTE carrier. Further, access node 610 can be configured to communicate using both RATs at the same time using, for example, 5G EN-DC. With reference to FIG. 6A, access node 610 is illustrated as being coupled to an antenna array 615, within which a first portion 616 of antenna elements is being used to communicate with wireless devices 620 using 4G, and a second portion 617 of antenna elements is being used to communicate with wireless device 630. The second portion 617 may be dedicated for communicating with wireless device 630 based on wireless device 630 meeting certain criteria, as described herein. Meanwhile, wireless devices 620 that do not meet the criteria may be prevented from using the dedicated antenna elements in portion 617, and access resources from antenna elements 616 as normal.

With reference to FIG. 6B, a number of wireless devices that meet the criteria has increased from FIG. 6A, as indicated by wireless devices 640 that are accessing network services from dedicated antenna elements in portion 617. In this embodiment, a size of portion 617 (i.e. quantity of antenna elements in portion 617) has increased and, correspondingly, a size of portion 616 has decreased. Further, assigning the portion 617 includes allocating resources used to communicate with wireless devices 640 (such as resource blocks, bearers, channels, etc.) to antenna elements within portion 617 that are configured to use a higher bandwidth, such as 5G antenna elements. For example, resources assigned to each antenna element in portion 617 may be increased, enabling the antenna elements to support the higher bandwidth that enables applications utilized by wireless devices 640. In other words, while other wireless devices 620 share antenna elements in portion 616 dynamically based on their location, signal conditions, etc., wireless devices 640 are assured continued and dedicated communication via the dedicated portion 617 of antenna elements as a consequence of meeting specific criteria.

Further, with reference to FIG. 6C, wireless devices 640 are shown to be operating in 5G EN-DC mode, in which control transmissions between wireless devices 640 and access node 610 may utilize 4G antenna elements 616, with antenna elements 617 being dedicated for data transmissions. For example, wireless devices 640 comprises any 5G-capable wireless device that is also capable of 5G EN-DC. Thus, antenna array 615 is split such that portion 617 of antenna elements is dedicated towards communicating with wireless devices 640, with control transmissions continuing to utilize 4G antenna elements 616.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dedicating antenna elements to wireless devices including a first wireless device and a second wireless device both located in a common coverage area of the antenna elements, the method comprising:
   determining that the first wireless device attached to an access node meets a set of criteria; and
   responsive to determining that the first wireless device meets the set of criteria, configuring a first portion of the antenna elements of the access node to transmit and/or receive data information to and/or from the first wireless device, and configuring a second portion of the antenna elements to transmit and/or receive control information to and/or from the first wireless device.

2. The method of claim 1, wherein determining that the first wireless device meets the set of criteria comprises:
   identifying a quality of service class indicator (QCI) associated with the first wireless device; and
   matching the QCI with an application type.

3. The method of claim 1, further comprising:
   correlating an application type with a first bandwidth; and
   determining that the first portion of the antenna elements is configured to deploy at least the first bandwidth.

4. The method of claim 3, further comprising:
   determining that a throughput of the first portion of the antenna elements meets a threshold; and
   increasing a quantity of antenna elements within the first portion of the antenna elements.

5. The method of claim 4, wherein determining that the throughput of the first portion of the antenna elements meets the threshold is based on determining that a quantity of wireless devices that meet the set of criteria meets a threshold quantity.

6. The method of claim 3, further comprising verifying that the first wireless device is capable of utilizing the first bandwidth.

7. The method of claim 1, wherein a second bandwidth corresponding to the second portion of the antenna elements is smaller than a first bandwidth corresponding to the first portion of the antenna elements.

8. The method of claim 1, further comprising:
   determining that the second wireless device attached to the access node does not meet the set of criteria; and
   responsive to determining that the second wireless device does not meet the set of criteria, preventing communication of data information with the second wireless device using the first portion of the antenna elements.

9. The method of claim 1, wherein the first portion of the antenna elements is configured to utilize 5G and the second portion of the antenna elements is configured to utilize 4G.

10. The method of claim 1, comprising:
    further responsive to determining that the first wireless device meets the set of criteria, configuring the first portion of the antenna elements of the access node not to transmit and/or receive control information to and/or from the first wireless device, and configuring the second portion of the antenna elements of the access node not to transmit and/or receive data information to and/or from the first wireless device.

11. A system for dedicating antenna elements including a first wireless device and a second wireless device both located in a common coverage area of the antenna elements, the system comprising:
    a processing node; and
    a processor coupled to the processing node, the processor being configured to perform operations comprising:
      determining that an application type of the first wireless device attached to an access node meets a criteria, wherein the access node comprises a plurality of antenna elements, and
      responsive to determining that the application type of the first wireless device meets the criteria, configuring a first portion of the antenna elements of the access node to communicate data information with the first wireless device, and configuring a second portion of the antenna elements to communicate control information with the first wireless device.

12. The system of claim 11, wherein determining that the application type meets the criteria is based on identifying a quality of service class indicator (QCI) associated with an application running on the first wireless device.

13. The system of claim 12, wherein the operations further comprise:
    correlating the QCI with a first bandwidth; and
    determining that the first portion of the antenna elements is configured to deploy at least the first bandwidth.

14. The system of claim 11, wherein the first portion of the antenna elements is configured to deploy a 5G wireless air interface.

15. The system of claim 14, further comprising determining that the first wireless device is capable of attaching to the 5G wireless air interface prior to configuring the first portion of the antenna elements.

16. The system of claim 11, wherein the operations further comprise:
    determining that a throughput of the first wireless device through the first portion of the antenna elements meets a threshold; and
    increasing a size of the first portion of the antenna elements.

17. The system of claim 11, wherein the operations further comprising:
    determining that an application type of the second wireless device attached to the access node does not meet the criteria; and
    responsive to determining that the application type of the second wireless device does not meet the criteria, preventing communication of data information with the second wireless device using the first portion of the antenna elements.

18. A processing node for dedicating antenna elements to wireless devices including a first wireless device and a second wireless device both located in a common coverage area of the antenna elements, the processing node being configured to perform operations comprising:
    determining that the first wireless device attached to an access node meets a criteria, wherein the criteria is associated with an application type;
    responsive to determining that the first wireless device meets the criteria, configuring the first wireless device to communicate data information with the access node via a first portion of the antenna elements of the access node and to communicate control information with the access node via a second portion of the antenna elements;
    determining that the second wireless device attached to the access node does not meet the criteria; and
    responsive to determining that the second wireless device does not meet the criteria, preventing the second wireless device from communicating data information with the access node via the first portion of the antenna elements, wherein the second wireless device communicates data information with the access node via one or more of the second portion of the antenna elements.

19. The processing node of claim 18, wherein the first portion of the antenna elements is configured to deploy a higher bandwidth than the second portion of the antenna elements.

20. The processing node of claim 19, wherein the higher bandwidth enables the first wireless device to communicate using the application type.

\* \* \* \* \*